| United States Patent [19] | [11] Patent Number: 4,764,932 |
|---|---|
| Peterson et al. | [45] Date of Patent: Aug. 16, 1988 |

[54] ION LASER HAVING DIRECT LIQUID COOLING OF SEGMENTED DISCHARGE TUBE

[75] Inventors: Royal D. Peterson, Alpharetta, Ga.; Ronald E. Jones, Cupertino, Calif.

[73] Assignee: Continental Laser Corporation, Mountain View, Calif.

[21] Appl. No.: 808,862

[22] Filed: Dec. 13, 1985

[51] Int. Cl.⁴ ............................................... H01S 3/04
[52] U.S. Cl. ....................................... 372/35; 372/34; 372/62
[58] Field of Search ....................... 372/34, 62, 86, 61, 372/35; 285/50, 80; 525/511

[56] References Cited

U.S. PATENT DOCUMENTS

| 3,670,261 | 6/1972 | Halsted et al. | 331/94.5 |
| 3,670,262 | 6/1972 | Hallock et al. | 372/35 |
| 3,705,999 | 12/1972 | Hermann et al. | 372/61 |
| 4,380,077 | 4/1983 | McMahan | 372/62 |
| 4,481,633 | 11/1984 | McMahan | 372/34 |

Primary Examiner—Eugene R. LaRoche
Assistant Examiner—Seung Ham
Attorney, Agent, or Firm—Thomas Schneck

[57] ABSTRACT

A gas laser having a segmented ceramic laser tube in which at least one thermally conducting, electrically insulating sleeve fits over the peripheral edges of segment interfaces. Coolant, such as tap water, passes in direct contact with the outer surface of the sleeve, but is excluded by the sleeve from corrosive contact with metal bonding at segment interfaces. A single sleeve may cover the entire length of the tube or each interface may be covered by a sleeve. A reservoir sleeve may fit over a portion of a gas reservoir, with coolant passing in direct contact with the outer surface of the reservoir sleeve. A cathode and anode at opposite ends of the tube sustain a gas discharge, while a resonant optical cavity aligned with the tube produces lasing action.

22 Claims, 1 Drawing Sheet

U.S. Patent  Aug. 16, 1988  4,764,932
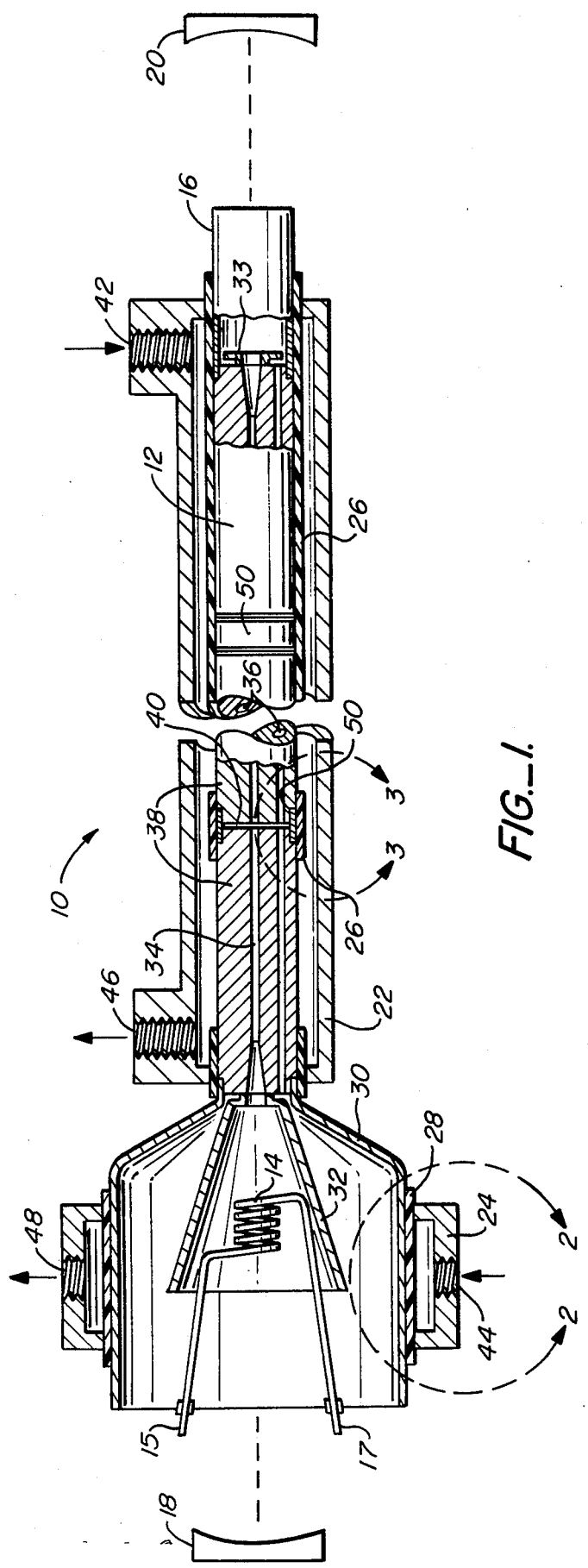
FIG._1.
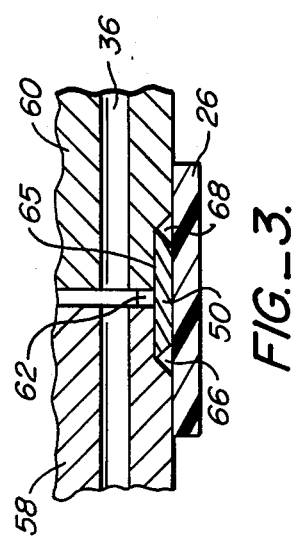
FIG._2.
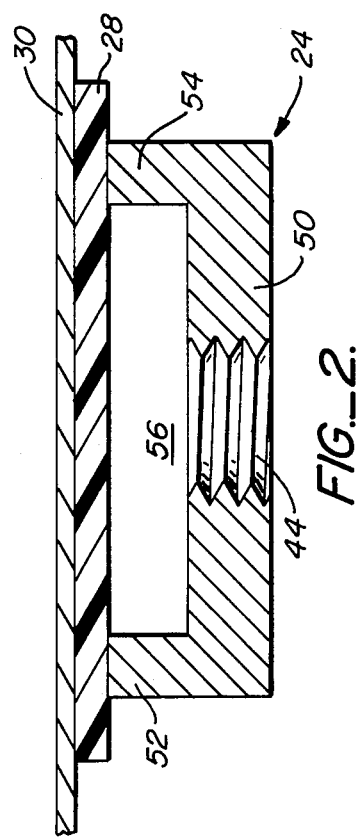
FIG._3.

ION LASER HAVING DIRECT LIQUID COOLING OF SEGMENTED DISCHARGE TUBE

DESCRIPTION

1. Technical Field

The present invention relates to liquid cooling of ion lasers and in particular to cooling of ion lasers with segmented discharge tubes.

2. Background Art

U.S. Pat. No. 4,380,077 to McMahan discloses a segmented ceramic laser tube. The laser tube is made up of segments, all formed of an insulating material, which are brazed together along metallized interfaces. The bore region of the tube is interrupted at each segment end by a chamfer or stepped area of larger diameter so as to prevent the establishment of a continuously electrically conductive surface layer along the length of the tube bore.

In U.S. Pat. No. 3,670,261 to Halsted et al., coolant such as ordinary tap water is passed in direct contact with the outer surface of a thermally conductive and electrically insulating cylindrical discharge-confining body. The anode is an electrically insulating ceramic body with metal coating bonded to an inner bore surface. Coolant passing in direct contact with the anode's outer surface is electrically insulated from the metal coating and an electrically conductive path thereto.

Efficient laser cooling is best achieved by passing coolant in direct contact with the outer lateral surfaces of the discharge tube. For reasons of economy, ordinary tap water is the coolant which is most often used. Unfortunately, when tap water which has a relatively high ion content contacts a metal body to which an electrical potential is applied, resultant electrolysis tends to corrode the metal body. In the case of segmented ceramic laser tubes, corrosion of exposed metal at bonded interfaces between segments has prevented the use of direct water cooling. Instead, prior art segmented tubes are cooled by a hose wrapped around the tubes and specifically avoiding contact with the interface regions.

An object of the present invention is to produce a gas laser having direct liquid cooling of the segmented ceramic discharge tube.

Another object of the invention is to produce a gas laser having direct liquid cooling of other hot metal parts of the laser, such as a reservoir housing a cathode.

DISCLOSURE OF THE INVENTION

The above objects have been met with a gas laser having a segmented ceramic laser tube in which at least one thermally conducting, electrically insulating sleeve fits over the outer peripheral edges of conductive segments or segment interfaces. Coolant, such as tap water, passes in direct contact with the outer surface of the sleeve and any portions of the outer surface of the tube not covered by the sleeve, but is excluded by the from corrosive contact with metal at segment interfaces.

The laser tube is a cylindrical tube having a discharge-confining longitudinal bore therethrough, formed of a plurality of electrically insulating cylindrical segments coaxially joined together at respective conductive segment interfaces, and containing a gas capable of laser action. A cathode and anode at opposite ends of the tube sustain a gas discharge in the bore, while a resonant optical cavity aligned with the tube causes stimulated emission and laser action.

A single protective sleeve may cover the entire length of the tube or, alternatively, a plurality of sleeves may each cover one of the electrically conductive segment interfaces. Electrical insulation in the protective sleeve or sleeves is achieved by choosing a dielectric sleeve material, such as a polymer, while thermal conductivity is achieved by making the sleeve thin. Sleeves may be preformed pieces of tubing or alternatively tape wound around and adhered to the laser tube. In each case, corrosive and possibly electrically hazardous contact of the coolant with metal bonding material is avoided while still maintaining efficient cooling through the thermally conducting sleeve. A reservoir sleeve, like the sleeve or sleeve fitting over the tube, may fit over a portion of the cathode containing gas reservoir, and coolant pass in direct contact with the outer surface of the reservoir sleeve to thereby efficiently cool the gas reservoir.

BRIEF DESCRIPTION OF THE DRAWINGS

FIG. 1 is a side cutaway view of a laser having a cooling system in accord with the present invention.

FIG. 2 is an enlargement encompassed by the circle 2—2 in FIG. 1.

FIG. 3 is an enlargement encompassed by the circle 3—3 in FIG. 1.

BEST MODE FOR CARRYING OUT THE INVENTION

With reference to FIG. 1, a gas laser 10 comprises a laser tube 12, a cathode 14 and an anode 16 at opposite ends of tube 12, mirrors 18 and 20 aligned with tube 12 to form a resonant optical cavity therebetween, and a liquid cooling assembly of jackets 22 and 24 and sleeves 26 and 28 for cooling the tube. A gas reservoir 30 is mounted in sealing relation to an end of tube 12. Cathode 14 is mounted within reservoir 30, along with a shield or bypass deflector 32. A gas capable of lasing action is contained within laser tube 12 and reservoir 30.

Laser tube 12 has a longitudinal discharge-containing bore 34 and one or more longitudinal gas bypass bores 36 therethrough. Bypass bores 36 typically have smaller diameters than discharge-containing bore 34 in order to reduce the chance of discharges occurring in bypass bores 36. Cylindrical laser tube 12 is formed of a plurality of electrically insulating cylindrical segments 38 joined together at respective segment interfaces 40. Each segment has an axis and segments are coaxially joined with bores in alignment forming a coaxial group. Segments 38 are typically composed of ceramic materials such as beryllia, alumina, and silica. Beryllia (BeO) is preferred because of its greater resistance to thermal shock and ion bombardment. To ensure durable operation, the segment interfaces 40 must provide good mechanical contact, and hold up to the differential thermal expansions of the metal and ceramic. Preferably, a metal braze ring 50 is used to connect the segments. Ceramic segments 38 that are metallized with a molybdenum-manganese alloy and then brazed to braze ring 50 with nickel provide durable connections.

Cathode 14 and bypass deflector 32 are mounted inside reservoir 30. Cathode 14 preferably has the helical shape well known in the gas layer art. Cathode electrodes 15 and 17 extend outside reservoir 30 and are electrically connected to a power source, not shown. A glow discharge is created in discharge bore 34 by exposing the gas contained by the layer tube 12 to a high r.f. field, which ionizes the gas. Heating of cathode 14 with a.c. power produces a local discharge near the cathode. The main discharge is then established and maintained by a d.c. field between cathode 14 and anode 16.

Gas reservoir 30 also contains a shield or bypass deflector 32 mounted to an end of laser tube 12. Deflector 32 is typically conical in shape, having a larger diameter open end surrounding a least a portion of cathode 14 and a smaller diameter aperture end. The aperture end typically has an aperture with a raised border mounted to tube 12 so that the aperture is aligned with discharge bore 34 and so that bypass bores 36 are outside of the raised aperture border.

The discharge current in discharge bore 34 causes the gas to be pumped from the cathode to the anode end of the laser tube 12. Gas then returns via the bypass bores 36. Deflector 32 helps guide the discharge down the discharge bore 34, while inhibiting discharge of gas returning to reservoir 30 along the bypass bores 36. A second deflector 33, an annular member, at the opposite end of laser tube 12 near anode 16 further inhibits unwanted discharge by shielding bypass bores 36 from anode 16. The second deflector 33, like the first deflector may be conductive, but at a floating electrical potential.

Laser 10 has a cooling assembly of jackets 22 and 24 and sleeves 26 and 28 for cooling the laser tube 12 and reservoir 30. At least one heat conducting, electrically insulating sleeve 26 fits over laser tube 12. Another heat conducting, electrically insulating sleeve 28, hereafter referred to as reservoir sleeve 28, fits over a portion of reservoir 30. Sleeves 26 cover metallized interfaces 40 between tube segments 38. There may be one sleeve 26 for each interface 40, or alternatively, one sleeve 26 for the entire laser tube 12. When heated, sleeves 26 and 28 shrink to a tight fit that keeps water or other coolant from seeping between sleeve and tube or sleeve and reservoir. While a heat shrinkable material is preferred, it is possible to use other tight fitting materials, such as elastomers, which have the desired electrical and thermal properties. For example, a rubber sleeve could be expanded by air pressure to fit over conductive segments, then allowed to contract in a tight fit over the segments. Adhesive tape made of heat stable electrically insulating material may be wrapped around all or portions of the laser tube to form a fluid-excluding sleeve. Examples of suitable tape materials are fiberglass-Teflon and the material marketed under the registered trademark "Kaptron". "Teflon" is a trademark of DuPont for polytetrafluoroethylene, a tough plastic which is not wetted by water. Other suitable materials may also be used.

Coolant flows into jackets 22 and 24 at input ports 42 and 44 respectively, contacts the outer surfaces of sleeves 26 and 28 and any uncovered portions of the segments 38, then out through output ports 46 and 48 respectively. Coolant is typically ordinary tap water, but may be any other liquid coolant that is used for gas laser cooling. Sleeves 26 and 28 keep the coolant away from contact with exposed metal at interfaces 40 of laser tube 12, such as braze ring 50, and from contact with metal reservoir 30. The excluded coolant is thereby prevented from corroding metal parts, while still being able to cool by direct contact with the surface to be cooled.

In FIG. 2, a coolant flowing through jacket 24 cools a gas reservoir 30. Gas reservoir 30 is typically made of a heat conducting metal, such as copper. A reservoir sleeve 28 fits over reservoir 30. Sleeve 28 is made of a heat conducting, electrically insulating material, such as the heat shrinkable plastic sleeve material marketed under the registered trademark "Thermofit". Preferably, the sleeve 28 is made as thin as possible, consistent with good electrical insulation, to allow for adequate heat conductivity. Typically, sleeve 28 is 15 mils (380 microns) thick. Thermofit material shrinks when heated to about 125 degrees Celsius to form a water-tight fit. Sleeve 28 may also be formed from electrically insulating adhesive tape wrapped around the reservoir, as discussed above. Jacket 24 comprises an annular part 50 spaced from sleeve 28 and two radial flange parts 52 and 54 contacting the sleeve 28. The jacket defines a containment space 56 into which coolant is introduced and in which coolant flows in contact with sleeve 28. Heat generated inside reservoir 30 passes through heat conducting reservoir 30 and sleeve 28 to the space 56 where it is removed by coolant. Coolant enters space 56 through an input opening 44 which may have screw threads or other means of screwing a fluid supply line to jacket 24. Coolant leaves space 56 at an output opening 48 on the opposite side of reservoir 30 from input opening 44.

In FIG. 3, a sleeve 26 provides a watertight fit over the interface between two laser tube segments 58 and 60. Segments 58 and 60 have bores, such as gas bypass bore 36 therethrough. An annular segment spacer 62 maintains segments 58 and 60 at a spaced apart separation in order to prevent electrically conducting deposits in bores, such as bore 36, from shorting the electrical parts from cathode to anode and thereby causing laser failure.

Segments 58 and 60 are bonded together at interfaces 40. In the present preferred embodiment, a braze ring 50 is brazed around the periphery of segments 58 and 60. Segments 58 and 60 are typically metallized with a molybdenum-maganese alloy between ring 50 and segment interface indentations 65, then brazed to metal ring 50 with nickel. Other braze metal compounds may also be used. The thickness of ring 50 is such as to be flush with the peripheral surface of segments 58 and 60 when placed in the indentations 65. Heat sink compound, such as Dow Corning "340 Silicone Heat Sink Compound", may be placed in channels 66 and 68 adjacent to braze ring 50.

A heat conducting, electrically insulating sleeve 26 fits over metal braze ring 50 at the interface between segments 58 and 60. Sleeve 26 may extend the length of the laser tube, thereby also fitting over other segment interfaces, or may alternately be limited to a single interface with other sleeves fitting over the other interfaces. Sleeve 26 is preferably made from heat shrinkable material like the Thermofit material discussed above, but may also be made from any of the other sleeve tubing or tape materials discussed above. When heated sleeve 26 shrinks so as to form a watertight fit which excludes coolant from contact with ring 50. Thus coolant may be passed over sleeve 26 without corroding or otherwise damaging the integrity of the metal at interface connection 40 between segments 58 and 60.

We claim:
1. An ion laser comprising,
   a tube having a longitudinal discharge bore therethrough, said tube being formed of a plurality of segments, said segments being adjoined at exteriorly conductive regions, said tube containing a gas capable of ionic lasing action, at least one elongated sleeve of thermally conducting, electrically insulating material covering the outer peripheral edges of said conductive regions of said tube, in a fluid-excluding fit, means for passing coolant in direct contact with the outer surface of said sleeve, cathode and anode means at opposite ends of said tube for sustaining an ionic discharge in said tube, and a resonant optical cavity aligned with said tube.

2. The laser of claim 1 wherein said sleeve is heat shrinkable material.

3. The laser of claim 2 wherein said heat shrinkable material is Thermofit material.

4. The laser of claim 1 wherein said sleeve is electrically insulating adhesive tape material wrapped around the conductive regions of said tube in a fluid-excluding fit.

5. The laser of claim 1 wherein said coolant is water.

6. The laser of claim 1 wherein adjacent segments are adjoined at segment interfaces and a plurality of sleeves cover said segment interfaces of said tube, each sleeve covering a single interface in a fluid-excluding fit.

7. The laser of claim 1 wherein a single sleeve covers the entire outer peripheral surface of said tube.

8. The laser of claim 1 further comprising a gas reservoir joined in sealing relation to an end of said tube, said cathode means being contained within said gas reservoir, a thermally conducting, electrically insulating reservoir sleeve fitting over a portion of said gas reservoir, and a second means for passing coolant in direct contact with the outer surface of said reservoir sleeve, said coolant being excluded by said reservoir sleeve from contact with said gas reservoir.

9. An ion laser comprising, an elongated tube having a longitudinal discharge bore therethrough, said tube being formed of a plurality of ceramic cylindrical segments joined together at respective segment interfaces, each pair of said segments being joined together by a metal ring, said pair of segments being joined to said ring at respective segment interfaces, said tube containing a gas capable of lasing action, at least on elongated sleeve of thermally conducting electrically insulating material covering said segment interfaces of said tube, said sleeve excluding fluid contact with said metal rings, means for passing coolant in direct contact with the outer surface of said sleeve and with portions of said outer surface of said tube uncovered by said sleeve, a cathode and anode means at opposite ends of said tube for sustaining a gas discharge in said tube, and a resonant optical cavity aligned with said tube.

10. The laser of claim 9 wherein said sleeve is made of a heat shrinkable material.

11. The laser of claim 10 wherein said sleeve is Thermofit material.

12. The laser of claim 9 wherein said sleeve is electrically insulating adhesive tape wrapped around said segment interfaces of said tube.

13. The laser of claim 9 wherein said coolant is water.

14. The laser of claim 9 wherein a plurality of sleeves cover said segment interfaces of said tube, each sleeve covering a single interface.

15. The laser of claim 9 wherein a single sleeve covers the entire outer peripheral surface of said tube.

16. The laser of claim 9 further comprising a gas reservoir joined in sealing relation to an end of said tube, said cathode means being contained within said gas reservoir, a thermally conducting, electrically insulating reservoir sleeve fitting over a portion of said gas reservoir, and a second means for passing coolant in direct contact with the outer surface of said reservoir sleeve, said coolant being excluded by said reservoir sleeve for contact with gas reservoir.

17. A laser tube comprising, a plurality of tube segments, each having an axis and joined together at respective segment interfaces, forming a coaxial group having a longitudinal discharge bore along a common axis of the segments; said bore containing a gas capable of lasing action, and a plurality of thermally conducting, electrically insulating sleeves covering in a fluid-excluding fit, the outer peripheral edges of said segment interfaces of said segments, each segment interface covered by a separate sleeve, each sleeve being elongated and being coaxial with said tube segments.

18. The laser tube of claim 17 wherein said segments are composed of ceramic material.

19. The laser tube of claim 18 wherein said segments are comprised of BeO.

20. The laser tube of claim 17 further comprising a gas reservoir joined in sealing relation to a segment at an end of said tube, a cathode being contained within said gas reservoir, and a thermally conducting, electrically insulating, heat shrinkable reservoir sleeve fitting over a portion of said reservoir.

21. The laser tube of claim 17 wherein each pair of said segments are joined together by a metal braze ring, said segments being brazed to said ring, said sleeve covering said ring in a fluid-excluding fit.

22. An ion laser tube cooling system comprising, a plurality of laser tube segments joined together forming a tube, some of said segments being exteriorly electrically conductive, electrically insulating and thermally conductive sleeve means disposed over said electrically conductive tube segments, and a coolant jacket spaced apart from and enclosing said sleeve means, said coolant jacket having coolant therein in thermal communication with said sleeve means.

* * * * *